Oct. 22, 1929.   C. E. SPARHAWK   1,732,544
BRAKE WHEEL FOR AEROPLANES
Filed Feb. 9, 1928
FIG. 1
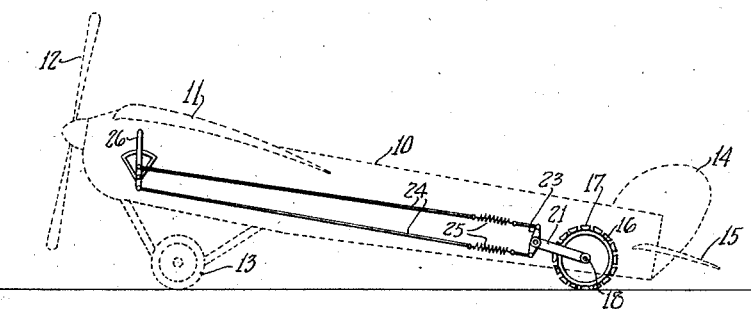
FIG. 2    FIG. 5
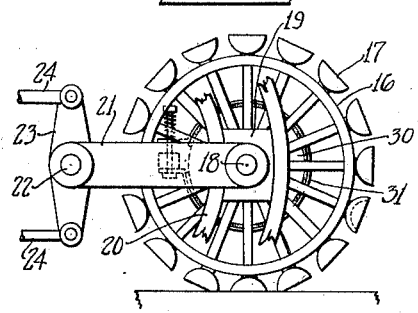   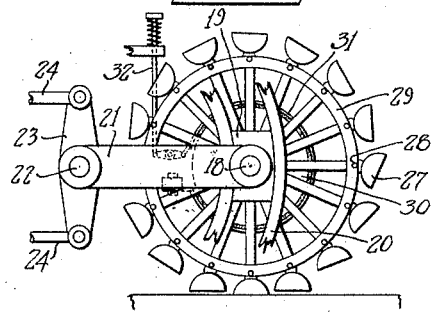
FIG. 6    FIG. 4    FIG. 3
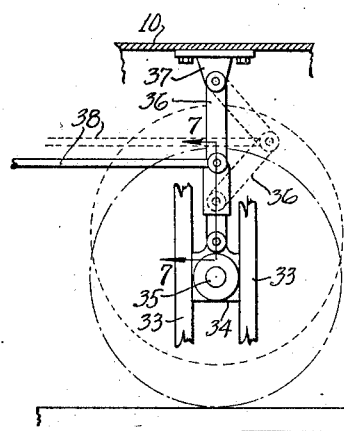   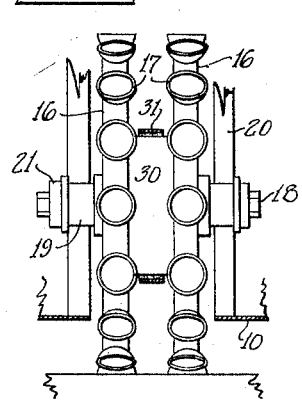   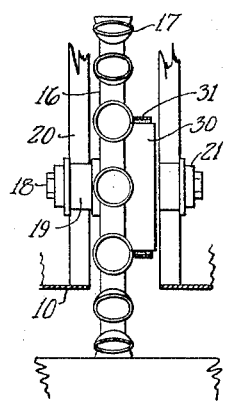
FIG. 7
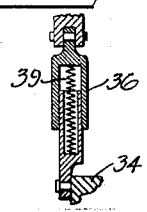
INVENTOR
C. E. Sparhawk
BY E. B. Birkenbeuel.
ATTORNEY Patented Oct. 22, 1929

1,732,544

UNITED STATES PATENT OFFICE

CHARLES E. SPARHAWK, OF STEILACOOM, WASHINGTON

BRAKE WHEEL FOR AEROPLANES

Application filed February 9, 1928. Serial No. 253,038.

This invention relates generally to the art of aviation and particularly to means for assisting an aeroplane in making a landing in a limited run-way.

The main object of this invention is to provide a brake wheel within the rear end of an aeroplane fuselage which can be lowered to a ground-engaging position when making a landing in order to more quickly retard the movement of the plane to adapt itself to making landings on restricted areas.

These, and other objects will become more apparent from the specification following as illustrated in the accompanying drawings, in which;

Figure 1 is a side elevation of a plane showing the relation of the device thereto. Figure 2 is an enlarged view of one form of the brake wheel. Figure 3 is an end elevation of the brake wheel shown in Figure 2. Figure 4 is an end elevation of a modified form of the brake wheel employing a plurality of rows of suction cups. Figure 5 illustrates the use of a modified form of cup and the same mechanism shown in Figure 2. Figure 6 is a side elevation of a modified wheel-lowering mechanism and Figure 7 is a section taken along the line 7—7 in Figure 6, showing the detailed structure of the modified wheel-lowering mechanism.

Similar numbers of reference refer to the similar parts throughout the several views.

Referring in detail to the drawings, there is illustrated the outline of an aeroplane fuselage 10, provided with the usual wings 11, propeller 12, landing gear 13, rudder 14 and elevator 15. Within the rear portion of the fuselage 10 is mounted a brake wheel 16 provided with a plurality of suction cups 17 around the periphery thereof. The wheel 16 is provided with a horizontal axle 18 which journals in the arcuate blocks 19 mounted on the curved guides 20 which are securely mounted to the fuselage in a convenient manner. The vertical position of the wheel is determined by the arms 21 which are pivotally mounted on the shaft 22 and on their rearward ends carry the axle 18. The shaft 22 may be rocked through the lever 23 to whose upper and lower ends are connected rods 24 on which are interposed the springs 25. A hand lever 26 is connected to the forward end of the rod 24 by means of which the wheel 16 may be raised or lowered; that is to say in flight the wheel would be drawn up into the fuselage tail where, when making a landing, the lever 26 would be moved to cause the wheel 16 to descend approximately to the position shown in Figure 1. In some instances it may be desirable to provide each cup 27 with a hinged connection 28 by means of which it is attached to the wheel 29 which is otherwise the equivalent of the wheel 16. The advantage arising from the use of this type of cup is the greater holding action produced at the cups due to the fact that they will remain parallel with the ground for a longer space of time and can only be separated therefrom by an actual pull, whereas if the cups are made rigid as shown in Figure 1 the suction grip is partly destroyed by the fact that the rearmost portion of the cup is lifted up first, thereby, breaking the seal and therefore the holding action of the cups 17 and 29.

It may in some instances be desirable to provide a brake drum 30 around which is placed a brake band 31 which is normally applied to the drum 30 by means of a spring urged pull rod 32. Owing to the fact that the landing areas are not always perfectly smooth and due to the numberless bounding actions at the rear of the plane it may be desirable to provide sufficient yielding action to the brake wheel to accommodate itself to a fairly wide range of uneven movements at the rear of the plane. For example in Figure 6, there is illustrated the upright guides 33 for the slides 34 which serve as bearings for the axle 35. The vertical position of this axle 35 is determined by the toggle levers 36 one end of which is fastened to the slides 34 and the other end of which is fastened to the bracket 37, attached to the fuselage 10. Motion is imparted to the toggle levers 36 by a pull rod 38 from a hand lever (not shown) which would be the equivalent of the lever 26. The lower toggle lever 36 is telescopic and is provided with an internal spring 39 which provides a yielding movement to the parts. The spring 39 functions in the same manner as does the spring 25, that is to say, regardless of where the hand lever 26 may be the brake wheel is capable of yielding.

There are of course numberless ways in which the brake wheel can be mounted on the rear of the fuselage, I, therefore, do not intend to limit myself to the particular device shown but I intend to cover such forms and modifications thereof as fall fairly within the appended claim.

I claim:

A brake wheel for aeroplanes consisting of a wheel member having mountings thereon permitting same to be moved upwardly or downwardly with relation to said plane, said wheel having suction cups mounted around same, each of said cups having a hinge connection to said wheel.

CHARLES E. SPARHAWK.